United States Patent
Zawadzki et al.

(10) Patent No.: US 12,248,580 B2
(45) Date of Patent: Mar. 11, 2025

(54) DETECTING SYNTHETIC USER ACCOUNTS USING SYNTHETIC PATTERNS LEARNED VIA MACHINE LEARNING

(71) Applicant: Chime Financial, Inc., San Francisco, CA (US)

(72) Inventors: Peter Zawadzki, San Mateo, CA (US); Jiby Babu, Austin, TX (US)

(73) Assignee: Chime Financial, Inc., San Francisco, CA (US)

( * ) Notice: Subject to any disclaimer, the term of this patent is extended or adjusted under 35 U.S.C. 154(b) by 328 days.

(21) Appl. No.: 17/651,390

(22) Filed: Feb. 16, 2022

(65) Prior Publication Data
US 2023/0259631 A1 Aug. 17, 2023

(51) Int. Cl.
G06F 21/57 (2013.01)
G06F 21/31 (2013.01)
G06F 21/55 (2013.01)
G06N 5/025 (2023.01)
G06N 20/00 (2019.01)

(52) U.S. Cl.
CPC .......... *G06F 21/577* (2013.01); *G06F 21/316* (2013.01); *G06F 21/554* (2013.01); *G06N 5/025* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,077,744 B2* | 7/2015 | Beutel | G06F 21/55 |
| 9,424,612 B1* | 8/2016 | Bright | G06F 16/9535 |
| 9,870,465 B1* | 1/2018 | Levi | G06F 21/577 |
| 10,333,964 B1* | 6/2019 | Freeman | H04L 63/1425 |
| 10,970,647 B1* | 4/2021 | Cevahir | H04L 51/52 |

(Continued)

OTHER PUBLICATIONS

Hakimi AN, Ramli S, Wook M, Mohd Zainudin N, Hasbullah NA, Abdul Wahab N, Mat Razali NA. Identifying fake account in facebook using machine learning. InAdvances in Visual Informatics: 6th International Visual Informatics Conference, IVIC 2019, Bangi, Malaysia, Nov. 19-21, 2019, Proceedings 6 2019 (Year: 2019).*

(Continued)

*Primary Examiner* — James R Turchen
(74) *Attorney, Agent, or Firm* — Keller Preece PLLC

(57) ABSTRACT

The present disclosure relates to systems, methods, and non-transitory computer-readable media that detect synthetic user accounts of a digital system via machine learning. For instance, the disclosed systems can utilize a machine learning model to analyze account features that are related to a user account and generate an indication that the user account is synthetic based on the analysis. The disclosed systems can further disable (e.g., suspend or close) the user account based on determining that the user account is synthetic. In some cases, the machine learning model provides a precision score that indicates a likelihood that the user account is synthetic, and the disclosed systems disable the user account if the precision score satisfies a threshold. In some implementations, the disclosed systems generate the machine learning model using synthetic user accounts detected via one or more rules and other user accounts that are associated with those synthetic user accounts.

20 Claims, 10 Drawing Sheets

(56) References Cited

U.S. PATENT DOCUMENTS

| | | | |
|---|---|---|---|
| 11,253,785 B1* | 2/2022 | Niknafs | A63F 13/79 |
| 11,861,003 B1* | 1/2024 | Imani Hossein Abad | G06F 21/554 |
| 2013/0139224 A1* | 5/2013 | Wehmeier | G06F 21/552 726/4 |
| 2013/0185230 A1* | 7/2013 | Zhu | G06N 20/00 726/22 |
| 2014/0040152 A1* | 2/2014 | Fang | G06Q 50/01 705/319 |
| 2014/0208424 A1* | 7/2014 | Hudack | H04L 63/1441 726/23 |
| 2015/0082448 A1* | 3/2015 | Elovici | G06Q 10/107 726/26 |
| 2020/0177698 A1* | 6/2020 | Zhavoronkov | H04L 67/535 |
| 2021/0074305 A1* | 3/2021 | Gopala | G10L 25/30 |
| 2021/0241120 A1* | 8/2021 | Chen | G06Q 30/0609 |
| 2022/0051264 A1* | 2/2022 | Compton | G06F 21/64 |
| 2022/0292615 A1* | 9/2022 | Hoskins, III | G06Q 50/01 |
| 2022/0360596 A1* | 11/2022 | Varnavas | G06F 21/50 |
| 2023/0009317 A1* | 1/2023 | Kang | G06N 3/0464 |
| 2023/0199002 A1* | 6/2023 | Kaidi | H04L 63/1425 726/22 |

OTHER PUBLICATIONS

Cao Q, Sirivianos M, Yang X, Pregueiro T. Aiding the detection of fake accounts in large scale social online services. In9th USENIX symposium on networked systems design and implementation (NSDI 12) 2012 (pp. 197-210). (Year: 2012).*

* cited by examiner

US 12,248,580 B2

DETECTING SYNTHETIC USER ACCOUNTS USING SYNTHETIC PATTERNS LEARNED VIA MACHINE LEARNING

BACKGROUND

Recent years have seen significant advancement in hardware and software platforms that provide security against fraudulent activity performed on digital systems. Indeed, as digital systems have become increasingly sophisticated and beneficial, efforts to defraud these digital systems or otherwise access their features, services, or data without authorization have escalated. Accordingly, other systems have developed to combat this activity. To illustrate, some systems have developed to identify user accounts that have been fraudulently registered (e.g., using false or stolen identifying information) with a digital system. Despite these advances, however, conventional systems often adhere to a rigid approach that limits their flexibility as well as their accuracy in detecting such fraudulent user accounts.

SUMMARY

One or more embodiments described herein provide benefits and/or solve one or more of the foregoing problems in the art with systems, methods, and non-transitory computer-readable media that utilize machine learning to flexibly and accurately detect and manage synthetic user accounts associated with a digital system. For example, in one or more embodiments, the disclosed systems generate a machine learning model to detect synthetic user accounts of a digital system. In particular, the disclosed systems can utilize a plurality of known synthetic user accounts as well as propagated synthetic user accounts (e.g., those closely associated with the known synthetic user accounts) to generate the machine learning model. The disclosed systems can utilize the machine learning model to analyze various features associated with a user account of the digital system—such as features related to the computing device associated with the user account or features related to the user profile or behavior of the user account—to determine if the user account is synthetic. Upon determining that the user account is synthetic with at least a threshold level of precision, the disclosed systems can disable (e.g., close or suspend) the user account. In this manner, the disclosed system can flexibly and accurately detect synthetic user accounts based on patterns determined through machine learning.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
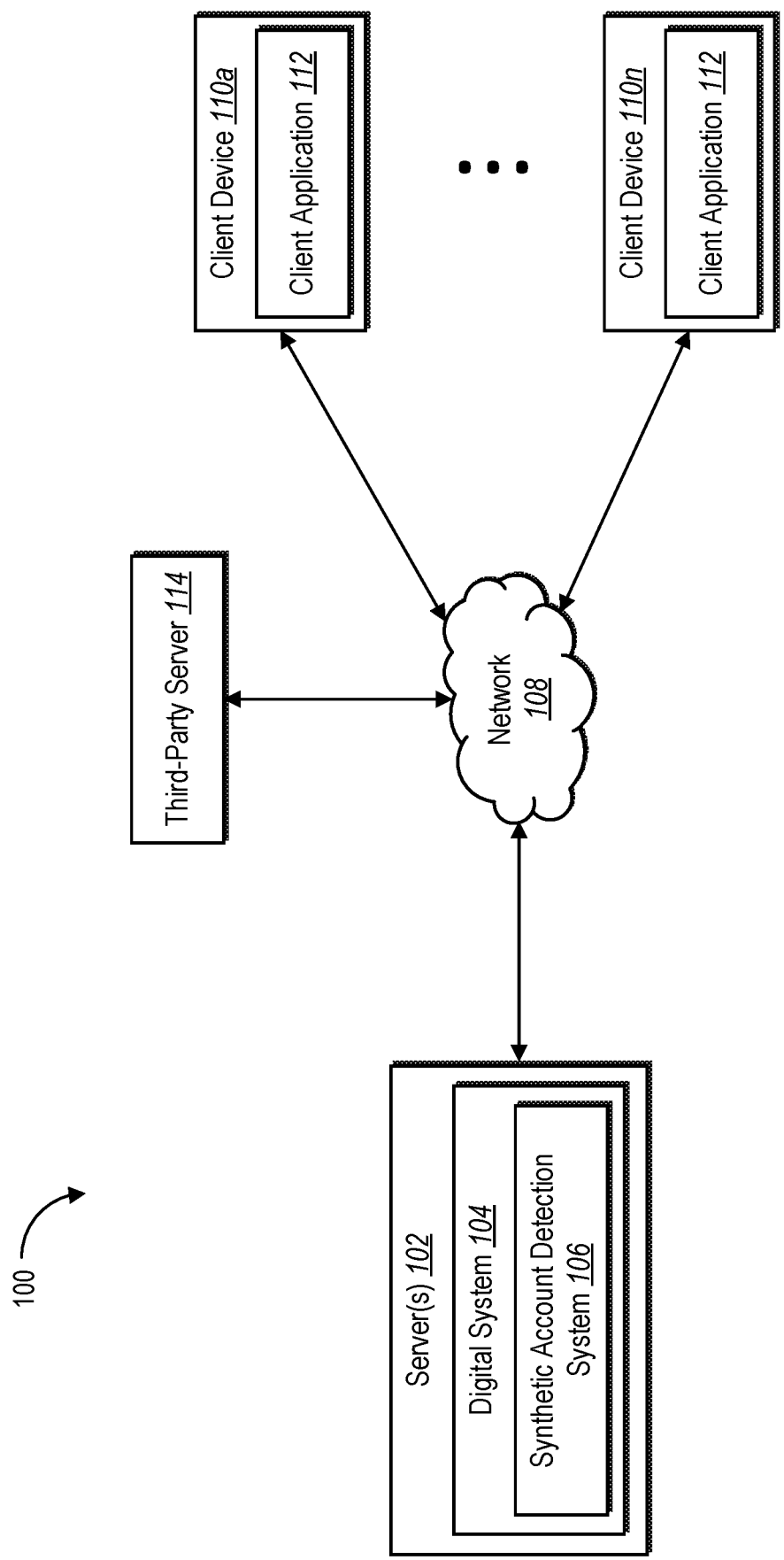
FIG. 1 illustrates an example environment in which a synthetic account detection system can operate in accordance with one or more embodiments.

One or more embodiments described herein include a synthetic account detection system that accurately detects synthetic user accounts of a digital system utilizing a flexible machine learning model. Indeed, in one or more embodiments, the synthetic account detection system utilizes a machine learning model—such as a random forest classifier—to analyze features associated with a user account of a digital system. The machine learning model can determine that a user account is synthetic or non-synthetic (e.g., authentic) based on analysis of the features, such as by determining a likelihood that the user account is synthetic. In response to determining that the user account is synthetic, the synthetic account detection system can prevent the user account from engaging with the digital system. In some implementations, the synthetic account detection system generates the machine learning model used for detecting synthetic user accounts. For instance, in some cases, the synthetic account detection system generates the machine learning model based on a set of existing synthetic user accounts, such as a set including known synthetic user accounts and/or suspected synthetic user accounts.

To illustrate, in one or more embodiments, the synthetic account detection system determines a plurality of account features related to a user account of a digital system. The synthetic account detection system also generates, utilizing a synthetic account detection machine learning model, an indication that the user account is synthetic based on the plurality of account features. Additionally or alternatively, the synthetic account detection system disables the user account to prevent one or more actions of the user account on the digital system based on the indication that the user account is synthetic.

As just mentioned, in one or more embodiments, the synthetic account detection system determines account features related to a user account of a digital system. In some instances, the synthetic account detection system determines at least some of the account features by tracking or generating the account features. In some additional or alternative implementations, the synthetic account detection system receives one or more account features from a third-party system.

As further discussed, in one or more embodiments, the synthetic account detection system utilizes a synthetic account detection machine learning model to determine that the user account is synthetic or non-synthetic (e.g., authentic) based on the account features. In particular, the synthetic account detection system can utilize the synthetic account detection machine learning model to analyze the account features of the user account and generate an indication that the user account is synthetic or non-synthetic based on the analysis. In one or more embodiments, the synthetic account detection machine learning model generates the indication by generating a precision score that indicates a likelihood that the user account is synthetic. For example, the synthetic account detection machine learning model can generate relatively higher precision scores for user accounts that are more likely to be synthetic and relatively lower precision scores for user accounts that are less likely to be synthetic (e.g., more likely to be non-synthetic).

Additionally, as mentioned, in one or more embodiments, the synthetic account detection system disables the user account based on an indication that the user account is synthetic. For example, in some implementations, the synthetic account detection system closes the user the account. In some cases, the synthetic account detection system suspends the user account. In some embodiments, the synthetic account detection system suspends the user account, sends a notification to the user account, and removes the suspension upon receiving a response to the notification that shows that the user account is non-synthetic (e.g., authentic).

In some embodiments, the synthetic account detection system disables the user account based on determining that the precision score generated by the synthetic account detection machine learning model satisfies a precision threshold. Indeed, in some cases, if the precision score does not satisfy the precision threshold, the synthetic account detection system maintains the current status of the user account (e.g., does not close or suspend the user account).

In at least one implementation, the synthetic account detection system lowers the precision threshold for disabling user accounts. To illustrate, in some cases, the synthetic account detection system utilizes an initial threshold to disable user accounts. Further, the synthetic account detection system implements a subsequent precision threshold—that is lower than the initial threshold—with a batch (e.g., a test batch) of user accounts. In other words, the synthetic account detection system determines to disable a user account from the batch if a precision score generated for the user account satisfies the subsequent precision threshold. Based on the performance of detecting synthetic user accounts in accordance with the subsequent precision threshold, the synthetic account detection system can determine to utilize the subsequent precision threshold further for disabling additional user accounts.

As previously mentioned, in some embodiments, the synthetic account detection system generates (e.g., trains) the synthetic account detection machine learning model to detect synthetic user accounts of the digital system. In some cases, the synthetic account detection system utilizes one or more sets of synthetic user accounts associated with the digital system to generate the synthetic account detection machine learning model.

For instance, the synthetic account detection system can determine a first set of synthetic user accounts that includes user accounts of the digital system using one or more synthetic account detection rules. Further, the synthetic account detection system can determine a second set of synthetic user accounts that includes additional user accounts of the digital system based on associations between the additional user accounts and the user accounts from the first set of synthetic user accounts. To illustrate, in some cases, the synthetic account detection system includes a user account in the second set of synthetic user accounts in response to determining that the user account shares an account feature (e.g., a device ID) with a user account from the first set of synthetic user accounts.

As mentioned above, conventional synthetic account detection systems suffer from several technological shortcomings that result in inflexible and inaccurate operation. For instance, conventional synthetic account detection systems are often inflexible in that they rely on a rigid set of rules to detect synthetic user accounts. Indeed, many conventional systems evaluate user accounts to determine that they are synthetic using a static set of rules. Accordingly, such systems fail to adapt to new patterns associated with synthetic user accounts.

In addition to flexibility concerns, conventional synthetic account detection systems are also inaccurate. Indeed, because many conventional systems fail to adapt to patterns associated with synthetic user accounts that are not already covered by the implemented set of rules, such systems fail to identify these patterns when evaluating user accounts. Accordingly, many conventional systems may inaccurately indicate that a user account is non-synthetic when it is synthetic or vice versa.

The synthetic account detection system provides several advantages over conventional systems. In particular, by utilizing a synthetic account detection machine learning model to detect user accounts, the synthetic account detection system can more flexibly adapt to patterns associated with synthetic user accounts. For instance, by generating the synthetic account detection machine learning model using known synthetic user accounts (e.g., those determined based on detection rules) and suspected synthetic user accounts (e.g., those having an association with at least one known synthetic user account), the synthetic account detection system can learn and recognize additional patterns that indicate that a user account is synthetic or non-synthetic.

Additionally, the synthetic account detection system operates more accurately than conventional systems. Indeed, as the synthetic account detection system can adapt to various patterns associated with synthetic user accounts in addition to those patterns recognized via detection rules, the synthetic account detection system can more accurately recognize such patterns when evaluating a given user account. Accordingly, the synthetic account detection system can more accurately indicate whether a user account is synthetic or non-synthetic.

As illustrated by the foregoing discussion, the present disclosure utilizes a variety of terms to describe features and benefits of the metric compression system. Additional detail is now provided regarding the meaning of these terms. For example, as used herein, the term "digital system" refers to a collection of digital services and/or features. In particular, a digital system can refer to a digital platform that provides accessibility to one or more services and/or features via a computing device, such as a client device. For instance, a digital system can include or be associated with a software application that can be downloaded to or otherwise accessed by a computing device.

Additionally, as used herein, the term "user account" refers to an account of a digital system that is associated with a user identity. In particular, a user account can refer to an account that is registered with a digital system and mapped to a particular user identity. The user account can enable a user associated with the user identity to access (e.g., using login credentials) the services and/or features provided by the digital system via a computing device. In one or more embodiments, a user account corresponds to identifying information of the associated user identity—which can include, but is not limited to, a social security number, an address, a phone number, a date of birth, a legal name, etc. For example, the digital system (e.g., the synthetic account detection system operating as part of the digital system) can create the user account using the identifying information and/or store the identifying information in association with the user account.

Relatedly, as used herein, the term "synthetic user account" refers to a user account associated with a fraudulent user identity. For example, a synthetic user account can refer to a user account that corresponds to fraudulent identifying information. For example, a synthetic user account can correspond to a collection of artificially created (e.g., fictitious) identifying information (e.g., identifying information that is not associated with a real person or does not exist). In some cases, a synthetic user account corresponds to misappropriated identifying information (e.g., identifying information that is associated with a real person but was used without the authorization of that person). Further, a synthetic user account can correspond to a combination of artificially created identifying information and misappropriated identifying information, or a combination of misappropriated identifying information from multiple real people.

As used herein, the term "account feature" refers to data associated with a user account. In particular, an account feature can refer to an attribute or characteristic associated with a user account. In one or more embodiments, an account feature includes data that is related to a user account and is generated, stored, tracked, or monitored by the digital system with which the user account is associated (or, more specifically, the synthetic account detection system). In some cases, however, an account feature includes data that is generated, stored, tracked, or monitored by a third-party system that is external to the digital system (or, at least, external to the synthetic account detection system). An account feature can include, but is not limited to, a user profile feature, a member acquisition feature, a member service feature, a device feature, a third-party feature (e.g., a feature related to one or more know-your-customer signals generated by a third-party service), a device ID feature, a device IP feature, a daily balance feature, or a feature related to the behavior of the user account, such as a feature related to one or more transactions associated with the user account.

Additionally, as used herein, the term "machine learning model" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

Relatedly, as used herein, the term "synthetic account detection machine learning model" refers to a machine learning model that identifies synthetic user accounts. In particular, a synthetic account detection machine learning model can refer to a machine learning model that can determine whether a given user account is synthetic based on account features related to the user account. For instance, a synthetic account detection machine learning model can include a machine learning model that generates an indication that a user account is synthetic or non-synthetic. A synthetic account detection machine learning model can include, for example, a random forest classifier, a decision tree (e.g., a gradient boosting model), a support vector machine, or a classification neural network.

As used herein, the term "precision score" refers to a quantitative measure associated with the authenticity of a user account. In particular, a precision score can refer to a quantitative value that indicates a likelihood that a user account is synthetic. For instance, a precision score can include a fraction (or percentage) that indicates a higher likelihood that a user account is synthetic when the precision score is closer to one (or one hundred percent). Conversely, the precision score can indicate a lower likelihood that a user account is synthetic (e.g., a higher likelihood that the user account is non-synthetic) when the precision score is closer to zero (or zero percent).

Additionally, as used herein, the term "precision threshold" refers to a threshold value for disabling user accounts of a digital system. In particular, a precision threshold can refer to a threshold score that a precision score determined for a user account must satisfy (e.g., meet or exceed) for the synthetic account detection system to take action against the user account.

Further, as used herein, the term "synthetic account detection rule" refers to a static rule for determining whether a user account of a digital system is synthetic or non-synthetic (e.g., authentic). In particular, a synthetic account detection rule can refer to an unchanging heuristic that, when applied to a user account (e.g., applied to its associated account features), provides an indication that the user account is synthetic or non-synthetic. For example, in one or more embodiments, the synthetic account detection system utilizes a plurality of synthetic account detection rules to analyze a user account (e.g., analyze its associated account features). Application of each rule can result in an indication of the user account being non-synthetic or synthetic. Based on the aggregation of the results (e.g., the aggregation of the indications), the synthetic account detection system can conclude that the user account is non-synthetic or synthetic. In some cases, a synthetic account detection rule provides a binary indication of whether a user account is synthetic or non-synthetic. In some instances, a synthetic account detection rule provides a score that indicates whether a user account is synthetic (e.g., the likelihood that the user account is synthetic).

As used herein, the term "model parameter" refers to a value or factor that, at least partially, affects the analysis performed by a model in generating an output. For example, in some embodiments, a model parameter includes a weight given to a function or operation performed by a model or a value analyzed or generated by the model that affects the output generated by the model. To illustrate, a model parameter can include a weight, value, or factor of a synthetic account detection machine learning model that affects a determination of the likelihood that a user account is synthetic (e.g., affects the precision score generated by the synthetic account detection machine learning model).

Additional detail regarding the synthetic account detection system will now be provided with reference to the figures. For example, FIG. 1 illustrates a schematic diagram of an exemplary system environment ("environment") 100 in which a synthetic account detection system 106 can be implemented. As illustrated in FIG. 1, the environment 100 includes a server(s) 102, a network 108, client devices 110a-110n, and a third-party server 114.

Although the environment 100 of FIG. 1 is depicted as having a particular number of components, the environment 100 can have any number of additional or alternative components (e.g., a different number of servers, client devices, third-party systems, or other components in communication with the synthetic account detection system 106 via the network 108). Similarly, although FIG. 1 illustrates a particular arrangement of the server(s) 102, the network 108, the client devices 110a-110n, and the third-party server 114, various additional arrangements are possible.

The server(s) 102, the network, 108, the client devices 110a-110n, and the third-party server 114 may be communicatively coupled with each other either directly or indirectly (e.g., through the network 108 as discussed in greater detail below in relation to FIG. 8). Moreover, the server(s) 102, the client devices 110a-110n, and the third-party server 114 may include a variety of computing devices (including one or more computing devices as discussed in greater detail with relation to FIG. 8).

As mentioned, the environment 100 includes the server(s) 102. In one or more embodiments, the server(s) 102 generates, stores, receives, and/or transmits digital data, including digital data related to user accounts of the digital system 104. For example, the server(s) 102 can receive, from a client device (e.g., one of the client devices 110a-110n), a request to create a user account associated with the digital system 104 and transmit information related to the request (e.g., a confirmation that the user account has been created or a verification email) to the client device in return. In one or more embodiments, the server(s) 102 comprises a data server. In some embodiments, the server(s) 102 comprises a communication server or a web-hosting server.

As shown, the server(s) 102 includes the digital system 104. In one or more embodiments, the digital system 104 provides a collection of services and/or features. Further, the digital system 104 can manage associated user accounts. For example, the digital system 104 can create user accounts, verify user accounts, close or suspend user accounts, and/or provide the services and/or features to the user accounts. To provide an illustration, in one or more embodiments, the digital system 104 includes a digital finance system that provides digital financial services (e.g., banking services, investment services, services related to cryptocurrency, etc.).

Additionally, the server(s) 102 includes the synthetic account detection system 106. In particular, in one or more embodiments, the synthetic account detection system 106 utilizes the server(s) 102 to detect synthetic user accounts of a digital system (e.g., the digital system 104). For example, the synthetic account detection system 106 can utilize the server(s) 102 to analyze a user account of the digital system 104 and determine that the user account is synthetic or non-synthetic.

To illustrate, in one or more embodiments, the synthetic account detection system 106, via the server(s) 102, determines a plurality of account features related to a user account of a digital system (e.g., the digital system 104). Additionally, via the server(s) 102, the synthetic account detection system 106 utilizes a synthetic account detection machine learning model to generate an indication that the user account is synthetic. Further, the synthetic account detection system 106 can, via the server(s) 102 disable the user account to prevent one or more actions of the user account on the digital system based on the indication that the user account is synthetic.

In one or more embodiments, the third-party server 114 interacts with the synthetic account detection system 106, via the server(s) 102, over the network 108. For example, the third-party server 114 can host a third-party system, such as an identity verification system, that verifies a user identity during registration of a user account. For instance, the third-party system can verify identifying information submitted to the digital system 104 during the registration process. In some cases, the third-party system performs document-based verification as part of the verification (e.g., verification based on a photo of a driver's license, proof of address, etc.). The third-party system can determine one or more account features related to the user account during the registration/verification process. Accordingly, the third-party server 114 can transmit the one or more account features to the synthetic account detection system 106 over the network 108.

In one or more embodiments, the client devices 110a-110n include computing devices that are capable of accessing the digital system 104 (e.g., to create a user account or utilize the services and/or feature offered). For example, in some implementations, the client devices 110a-110n include at least one of a smartphone, a tablet, a desktop computer, a laptop computer, a head-mounted-display device, or other electronic device. In some instances, the client devices 110a-110n include one or more applications (e.g., the client application 112) that are capable of accessing the digital system 104 (e.g., to create a user account or utilize the services and/or feature offered). For example, in some embodiments, the client application 112 includes a software application installed on the client devices 110a-110n. In other cases, however, the client application 112 includes a web browser or other application that accesses a software application hosted on the server(s) 102.

The synthetic account detection system 106 can be implemented in whole, or in part, by the individual elements of the environment 100. Indeed, although FIG. 1 illustrates the synthetic account detection system 106 implemented with regard to the server(s) 102, different components of the synthetic account detection system 106 can be implemented by a variety of devices within the environment 100. For example, one or more (or all) components of the synthetic account detection system 106 can be implemented by a different computing device (e.g., one of the client devices 110a-110n) or a separate server from the server(s) 102 hosting the digital system 104. Example components of the synthetic account detection system 106 will be described below with regard to FIG. 5.

Figure 2:
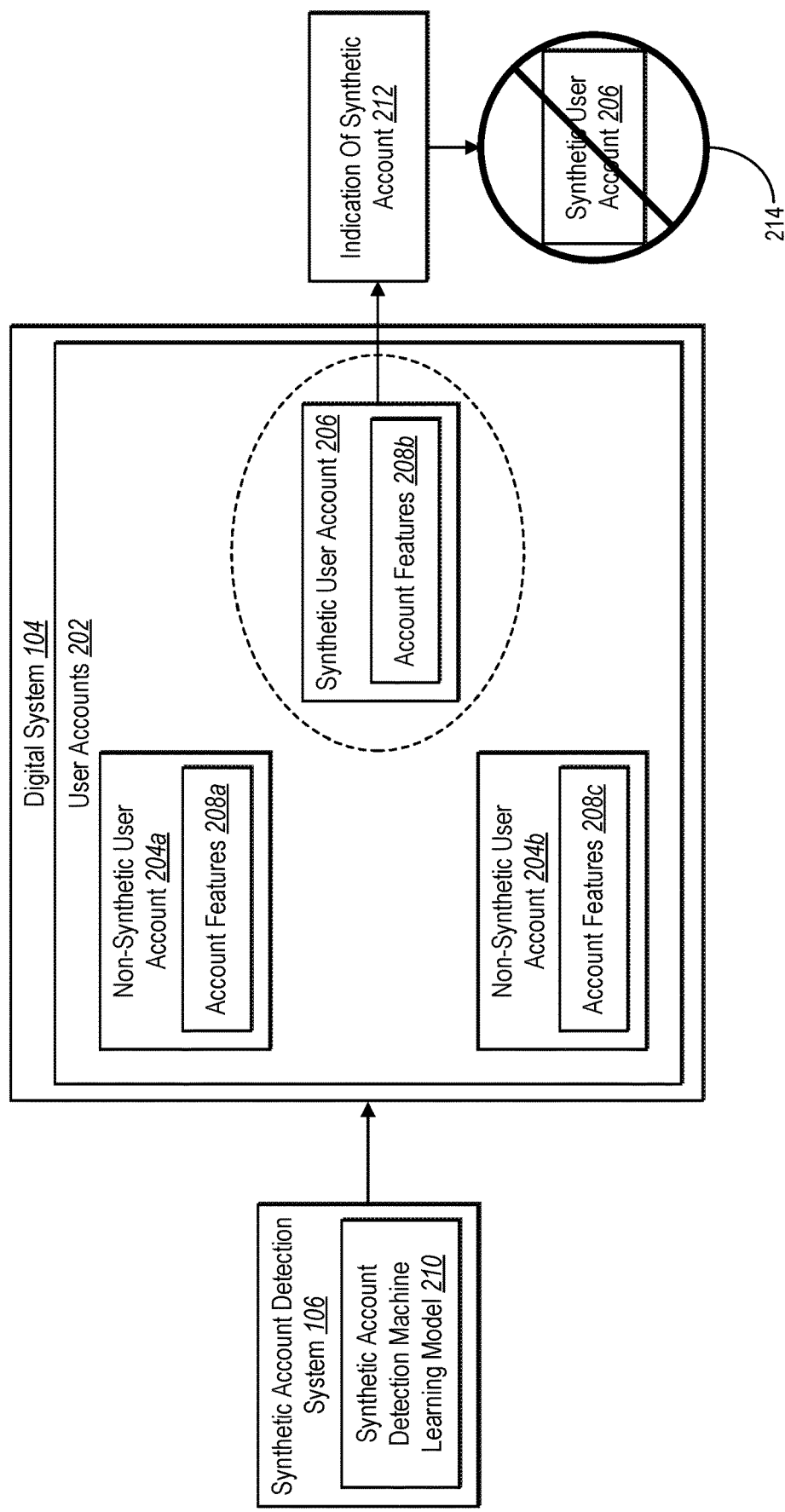
FIG. 2 illustrates an overview diagram of the synthetic account detection system determining that a user account is synthetic in accordance with one or more embodiments.

As mentioned above, the synthetic account detection system 106 detects synthetic user accounts associated with a digital system. In particular, the synthetic account detection system 106 determines whether a given user account of the digital system is synthetic. FIG. 2 illustrates an overview diagram of the synthetic account detection system 106 determining that a user account is synthetic in accordance with one or more embodiments.

As shown in FIG. 2, the synthetic account detection system 106 identifies user accounts 202 of a digital system 104. In particular, the synthetic account detection system 106 can identify the user accounts 202 for analysis of the user accounts 202 to detect any included synthetic user accounts. Indeed, as illustrated, the user accounts 202 can include one or more non-synthetic (e.g., authentic) user accounts (e.g., the non-synthetic user accounts 204a-204b)

and one or more synthetic user accounts (e.g., the synthetic user account 206). It should be understood, however, that a user account is not labeled as non-synthetic or synthetic (at least, not until after they have been analyzed). Rather, the designation of "non-synthetic user account" and "synthetic user account" shown in FIG. 2 is merely provided to illustrate that some user accounts of the digital system 104 can be non-synthetic while others can be synthetic.

As further shown in FIG. 2, the synthetic account detection system 106 determines various account features for each user account (e.g., the account features 208a-208c). In one or more embodiments, the synthetic account detection system 106 generates, tracks, and/or stores the account features related to each user account. Accordingly, the synthetic account detection system 106 can determine the account features related to a user account by retrieving the account features from local storage. In some implementations, however, at least one of the account features related to a user account are generated, tracked, and/or stored by a third-party system. Accordingly, the synthetic account detection system 106 can determine the account features related to a user account by receiving one or more account features from the third-party system.

Additionally, as mentioned above, the synthetic account detection system 106 analyzes the user accounts 202. In one or more embodiments, the synthetic account detection system 106 analyzes the user accounts 202 in batches. In particular, the synthetic account detection system 106 can analyze subsets of user accounts from the user accounts 202 to detect any included user accounts. In some implementations, the synthetic account detection system 106 analyzes each user account individually. In some cases, the synthetic account detection system 106 analyzes all user accounts of the digital system 104 simultaneously.

In particular, as illustrated by FIG. 2, the synthetic account detection system 106 utilizes a synthetic account detection machine learning model 210 to analyze the user accounts 202. In one or more embodiments, the synthetic account detection system 106 utilizes the synthetic account detection machine learning model to analyze a given user account by analyzing the account features related to that user account. Indeed, based on the account features related to the user account, the synthetic account detection machine learning model 210 can generate an indication that the user account is synthetic. For example, as shown in FIG. 2, the synthetic account detection machine learning model 210 generates an indication (represented by box 212) that the synthetic user account 206 is synthetic based on the account features 208.

Further, as shown in FIG. 2, based on the indication that the synthetic user account 206 is synthetic, the synthetic account detection system 106 disables the synthetic user account 206 (as represented by circle 214). For example, the synthetic account detection system 106 can close or suspend the synthetic user account 206. In some cases, the synthetic account detection system 106 block access to one or more high-valued features available on the digital system 104 (e.g., those having a high impact on other user accounts, for example). Accordingly, the synthetic account detection system 106 can prevent the synthetic user account 206 from performing actions on the digital system 104.

In one or more embodiments, based on the account features related to a user account, the synthetic account detection machine learning model 210 generates an indication that the user account is non-synthetic (e.g., authentic). Accordingly, in some implementations, the synthetic account detection system 106 maintains the current status of the user account on the digital system 104 (e.g., doesn't close or suspend the user account). As will be discussed in more detail below, the synthetic account detection machine learning model 210 generates an indication of whether a user account is synthetic or non-synthetic by generating a precision score.

Figure 3A:
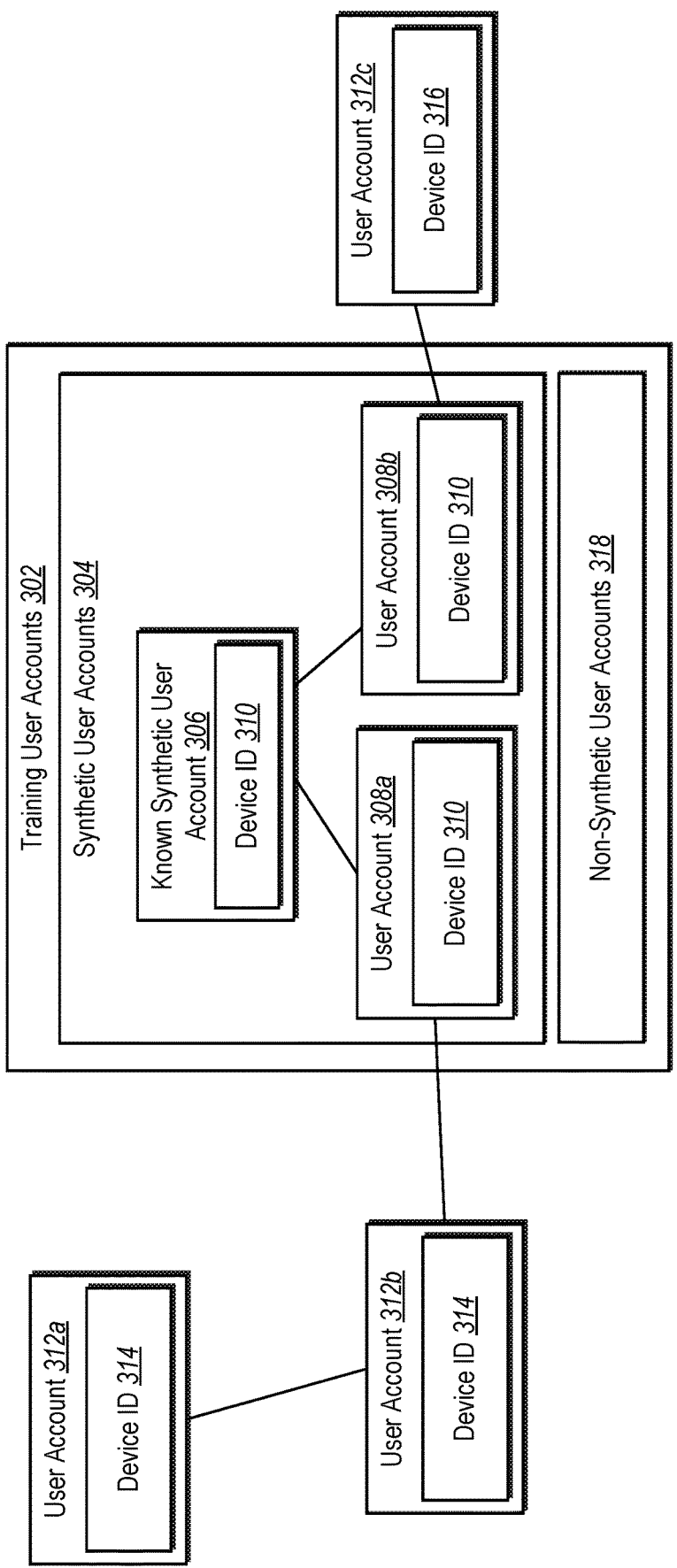
FIG. 3A illustrates a diagram for determining training user accounts for use in generating a synthetic account detection machine learning model in accordance with one or more embodiments.
Figure 3B:
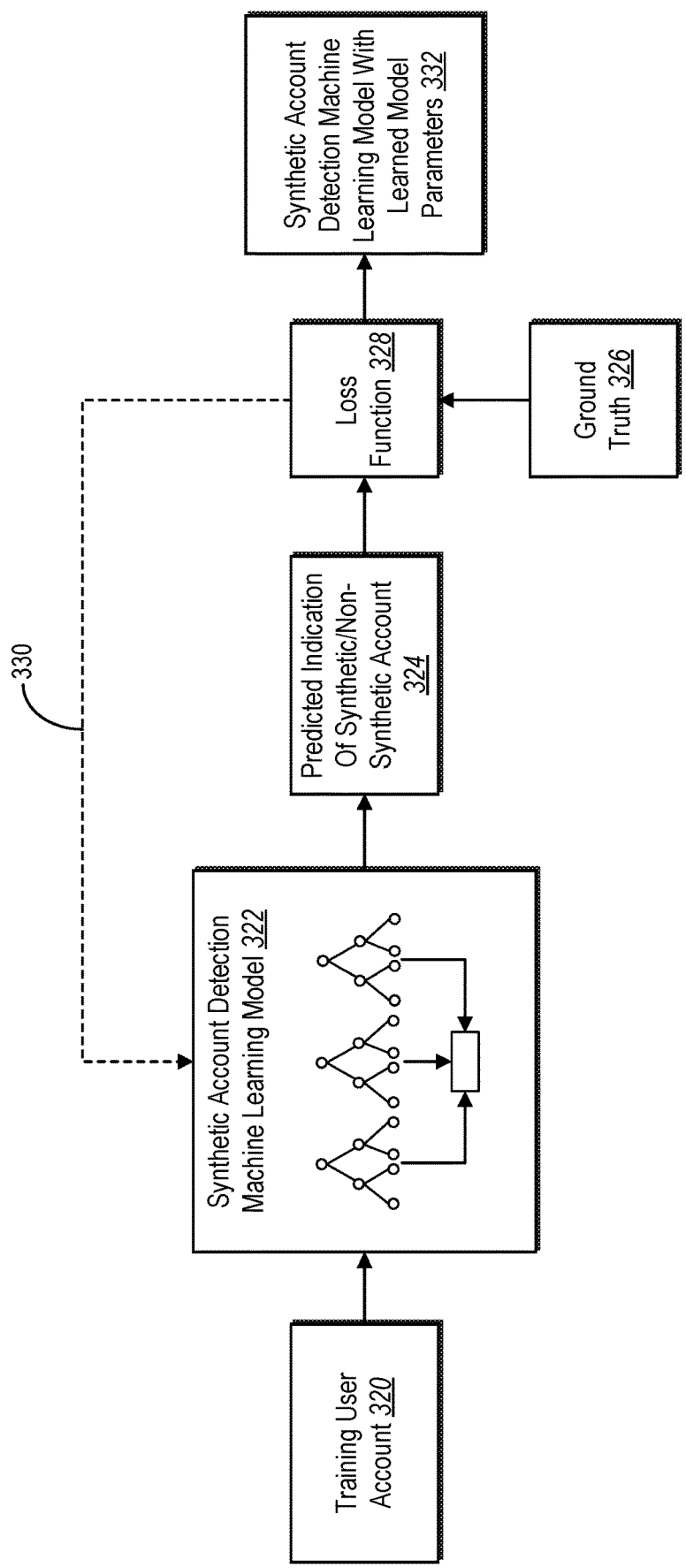
FIG. 3B illustrates a block diagram for training a synthetic account detection machine learning model in accordance with one or more embodiments.

As discussed above, in one or more embodiments, the synthetic account detection system 106 generates (e.g., trains) a synthetic account detection machine learning model to detect synthetic user accounts of a digital system (e.g., determine whether a given user account is synthetic). FIGS. 3A-3B illustrate diagrams for generating a synthetic account detection machine learning model that can detect synthetic user accounts in accordance with one or more embodiments.

In particular, FIG. 3A illustrates a diagram for determining training user accounts 302 for use in generating a synthetic account detection machine learning model in accordance with one or more embodiments. In one or more embodiments, the synthetic account detection system 106 determines the training user accounts 302 by identifying current user accounts associated with a digital system (e.g., user accounts currently active on the digital system). In some cases, the synthetic account detection system 106 determines the training user accounts 302 by additionally (or alternatively) identifying previous user accounts associated with the digital system (e.g., user accounts that are no longer active on the digital system).

As shown in FIG. 3A, the synthetic account detection system 106 determines the training user accounts 302 by identifying synthetic user accounts 304. For example, as shown, the synthetic account detection system 106 can identify one or more known synthetic user accounts, such as the known synthetic user account 306. In one or more embodiments, the synthetic account detection system 106 identifies a known synthetic user account using one or more synthetic account detection rules. To illustrate, the synthetic account detection system 106 can analyze a user account using the one or more synthetic account detection rules and determine that the user account is synthetic based on the analysis. In some implementations the synthetic account detection system 106 determines that a user account is synthetic based on all of the synthetic account detection rules indicating that the user account is synthetic, based on a majority of the synthetic account detection rules indicating that the user account is synthetic, or based on a weighting applied to the synthetic account detection rules indicating that the user account is synthetic.

Additionally, as shown in FIG. 3A, the synthetic account detection system 106 determines the synthetic user accounts 304 by further identifying one or more user accounts that are associated with a known user account. For instance, as shown, the synthetic account detection system 106 identifies the user account 308a and the user account 308b that are associated with the known synthetic user account 306. In one or more embodiments, the synthetic account detection system 106 determines that a user account is associated with a known user account if the user account shares a common account feature with the known user account. Indeed, as illustrated in FIG. 3A, the synthetic account detection system 106 can determine that the user accounts 308a-308b are associated with the known synthetic user account 306 based on determining that the user accounts 308a-308b and the known synthetic user account 306 are associated with the device ID 310. For example, the synthetic account detection system 106 can determine that the known synthetic user account 306 and the user accounts 308a-308b were created using a computing device having the device ID 310 (e.g., they were created based on a request/input received from the same computing device).

Though FIG. 3A illustrates determining an association between a user account and a known synthetic user account based on a common device ID, the synthetic account detection system 106 can determine an association between a user account and a known synthetic user account based on various other common account features (e.g., physical address, same email address, phone number, etc.). Further, in some implementations, the synthetic account detection system 106 determines an association between a user account and a known synthetic user account based on a combination of common account features. For example, the synthetic account detection system 106 can determine that a user account and a known synthetic user account are associated based on having a set number of common account features (e.g., two common account features, three common account features, etc.) or based on having a particular combination of common account features (e.g., having the same device ID and the same email address). In some cases, the synthetic account detection system 106 applies weights to the account features and determines an association between a user account and a known synthetic user account using a weighted combination of account features.

As further shown in FIG. 3A, the synthetic account detection system 106 includes, within the synthetic user accounts 304, user accounts that are directly associated with the known synthetic user account 306 but excludes user accounts that are indirectly associated with the known synthetic user account 306. In other words, the synthetic account detection system 106 includes user accounts that have a direct connection to the known synthetic user account 306 (e.g., share a common account feature with the known synthetic user account 306). Conversely, the synthetic account detection system 106 excludes user accounts that do not have a direct connection to the known synthetic user account 306 (e.g., do not share a common account feature with the known synthetic user account 306).

For instance, as shown in FIG. 3A, the synthetic account detection system 106 excludes the user accounts 312a-312c from the synthetic user accounts 304. The user accounts 312b-312c can include user accounts that have different device IDs (a device ID 314 and a device ID 316, respectively) than the known synthetic user account 306 and the user accounts 308a-308b. The user accounts 312b-312c, however, can be associated with the user accounts 308a-308b, respectively, based on some other common account feature. Thus, the user accounts 312b-312c are indirectly associated with the known synthetic user account 306. Similarly, the user account 312a is directly associated with the user account 312b based on the user accounts 312a-312b having the device ID 314 but is not directly related to the known synthetic user account 306. Accordingly, the synthetic account detection system 106 excludes the user accounts 312a-312c from the synthetic user accounts 304 of the training user accounts 302. In some implementations, however, the synthetic account detection system 106 can include, within the synthetic user accounts 304 of the training user accounts 302, user accounts that are indirectly associated with the known synthetic user account 306.

Put differently, in one or more embodiments, the synthetic account detection system 106 generates a node graph representing associations between user accounts. For instance, the synthetic account detection system 106 can generate the node graph by generating nodes that correspond to the user accounts and generating an edge between a pair of nodes if the corresponding user accounts share at least one common account feature. The synthetic account detection system 106 can identify a node that corresponds to a known synthetic user account. The synthetic account detection system 106 can include, within the synthetic user accounts 304 of the training user accounts 302, user accounts corresponding to other nodes that are directly connected to that node (e.g., are within one hop of the node corresponding to the known synthetic user account). The synthetic account detection system 106 can exclude those user accounts corresponding to nodes that are not directly connected to the node corresponding to the known user account (e.g., are two hops or more away from the node corresponding to the known synthetic user account). In some cases, however, the synthetic account detection system 106 includes user accounts corresponding to nodes that are indirectly connected to the node corresponding to the known synthetic user account (e.g., are within two hops, are within three hops, etc.).

Thus, the synthetic account detection system 106 determines the synthetic user accounts 304 to include in the training user accounts 302 by determining a first set of synthetic user accounts from user accounts of a digital system using one or more synthetic account detection rules. In some implementations, the synthetic account detection system 106 removes, from the first set, user accounts that were reactivated based on a showing that the user accounts were non-synthetic. Further, the synthetic account detection system 106 can determine a second set of synthetic user accounts that include user accounts of the digital system having an association with (e.g., a direct connection, such as by having a common account feature) at least one user account from the first set of synthetic user accounts (e.g., a known synthetic user account). As such, in some implementations, the synthetic account detection system 106 determines it is likely that the user accounts included in the second set are synthetic (e.g., suspects that the user accounts are synthetic) even though the synthetic account detection rules do not indicate that they are synthetic. In some implementations, the user accounts from the second set are associated with unauthorized activities. In some cases, the synthetic account detection system 106 removes these user accounts from the second set if these activities have been approved.

In some implementations, the synthetic account detection system 106 weighs the first and second set of synthetic user accounts differently. For instance, the synthetic account detection system 106 can weigh the first set of user accounts higher than the second set as the first set includes synthetic user accounts detected via the synthetic account detection rules.

Additionally, as shown in FIG. 3A, the synthetic account detection system 106 determines the training user accounts 302 by further identifying non-synthetic user accounts 318. In one more embodiments, the non-synthetic user accounts 318 include those user accounts determined to be non-synthetic based on the one or more synthetic account detection rules and that do not have an association with a known synthetic user account (e.g., are not directly associated with a known synthetic user account, such as by having a common account feature).

FIG. 3B illustrates a block diagram for training a synthetic account detection machine learning model 322 in accordance with one or more embodiments. As shown in FIG. 3B, the synthetic account detection system 106 implements the training by providing a training user account 320 to the synthetic account detection machine learning model 322. In one or more embodiments, the synthetic account detection system 106 determines (e.g., identifies) the training user account 320 as discussed above with reference to FIG. 3A.

Additionally, as shown in FIG. 3B, the synthetic account detection system 106 utilizes the synthetic account detection machine learning model 322 to generate a predicted indication for the training user account 320. In particular, the synthetic account detection system 106 utilizes the 322 to generate a predicted indication that the user account is synthetic or a predicted indication that the user account is non-synthetic (as shown by box 324).

Further, as shown in FIG. 3B, the synthetic account detection system 106 compares the predicted indication that the user account is synthetic or non-synthetic with a ground truth 326. In one or more embodiments, the ground truth 326 includes a label or other indication that the training user account 320 is synthetic or non-authentic.

As illustrated, the synthetic account detection system 106 compares the predicted indication with the ground truth 326 via a loss function 328. The synthetic account detection system 106 can utilize the loss function 328 to determine the loss (i.e., error) resulting from synthetic account detection machine learning model 322 based on the comparison. The synthetic account detection system 106 can back propagate the determined loss to the synthetic account detection machine learning model 322 (as shown by the dashed line 330) to optimize the model by updating its model parameters. Indeed, the synthetic account detection system 106 updates the model parameters to minimize the error of the synthetic account detection machine learning model 322.

Though FIG. 3B illustrates one training iteration, it should be noted that, in one or more embodiments, the synthetic account detection system 106 trains the synthetic account detection machine learning model 322 using multiple training iterations. Indeed, with each training iteration, the synthetic account detection system 106 gradually improves the accuracy with which the synthetic account detection machine learning model 322 determines that a user account is synthetic or non-synthetic. Thus, the synthetic account detection system 106 generates the synthetic account detection machine learning model with learned model parameters 332.

Figure 4A:
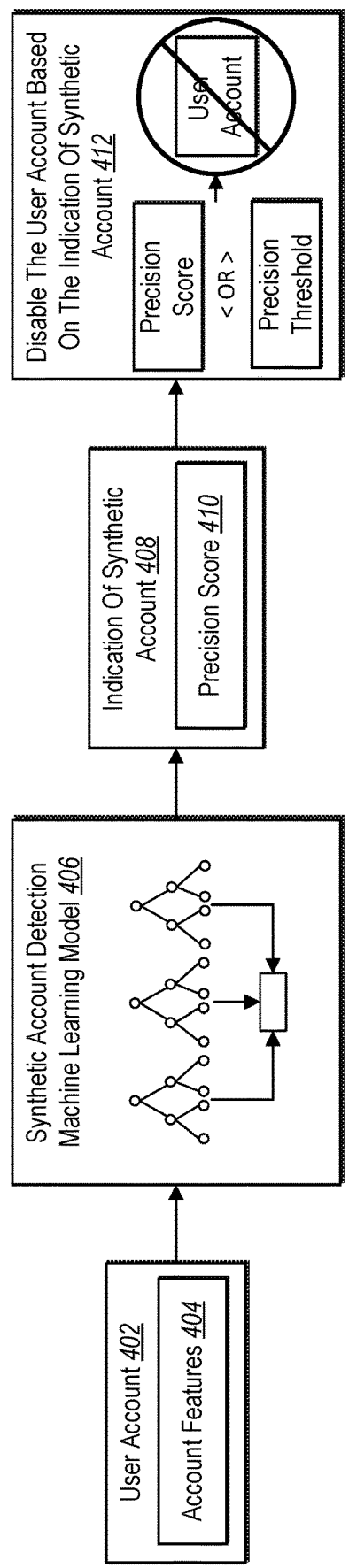
FIG. 4A illustrates a diagram for utilizing a synthetic account detection machine learning model to generate an indication that a user account is synthetic in accordance with one or more embodiments.
Figure 4B:
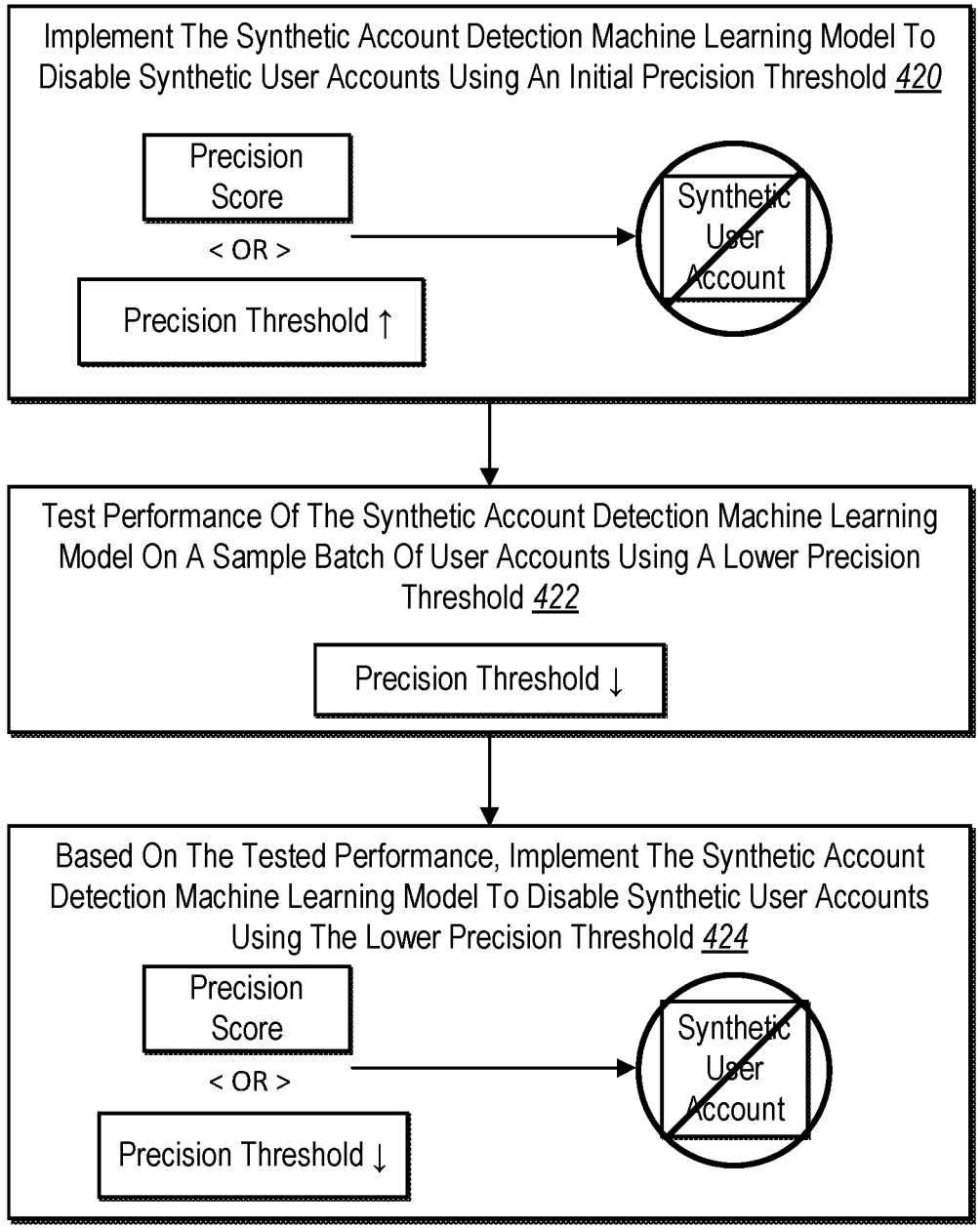
FIG. 4B illustrates a diagram for lowering the precision threshold for disabling synthetic user accounts in accordance with one or more embodiments.

As previously mentioned, the synthetic account detection system 106 can utilize a synthetic account detection machine learning model to detect synthetic user accounts of a digital system. In particular, the synthetic account detection system 106 can utilize a synthetic account detection machine learning model to determine whether a given user account is synthetic or non-synthetic. FIGS. 4A-4B illustrate diagrams for using a synthetic account detection machine learning model to determine whether a user account is synthetic or non-synthetic in accordance with one or more embodiments.

In particular, FIG. 4A illustrates a diagram for utilizing a synthetic account detection machine learning model to generate an indication that a user account is synthetic in accordance with one or more embodiments. Indeed, as shown in FIG. 4A, the synthetic account detection system 106 utilizes a synthetic account detection machine learning model 406 to analyze a user account 402. In particular, the synthetic account detection system 106 utilizes the synthetic account detection machine learning model 406 to analyze account features 404 related to the user account 402. In some cases, the synthetic account detection system 106 updates the account features 404 before analysis to ensure the account features 404 are current. Based on the account features 404, the synthetic account detection machine learning model 406 generates an indication that the user account 402 is synthetic (represented by box 408).

As illustrated in FIG. 4A, the indication that the user account 402 is synthetic includes a precision score 410. Indeed, in one or more embodiments, the synthetic account detection machine learning model 406 generates an indication that a user account is synthetic (or non-synthetic) by generating a precision score that indicates a likelihood that the user account is synthetic. For instance, the synthetic account detection machine learning model 406 can generate the precision score 410 based on the account features 404 related to the user account 402. In some implementations, however, the synthetic account detection machine learning model 406 generates an indication that a user account is synthetic or non-synthetic by generating a classification (e.g., a label) that indicates the user account is synthetic or non-synthetic.

As further illustrated in FIG. 4A, the synthetic account detection system 106 performs an act 412 of disabling the user account 402 based on the indication that the user account 402 is synthetic. For example, in one or more embodiments, the synthetic account detection system 106 compares the precision score 410 generated by the synthetic account detection machine learning model 406 with a precision threshold. In some embodiments, upon determining that the precision score 410 satisfies (e.g., meets or exceeds) the precision threshold the synthetic account detection system 106 disables the user account 402. In some cases, upon determining that the precision score 410 does not satisfy the precision threshold, the synthetic account detection system 106 maintains the current status of the user account 402 on the digital system.

In one or more embodiments, the synthetic account detection system 106 disables the user account 402 by closing the user account 402. In particular, the synthetic account detection system 106 can delete or remove the user account 402 from the digital system or otherwise prevent access to the digital system via the user account 402. In some implementations, the synthetic account detection system 106 disables or deactivates the user account 402 by suspending the user account 402. For example, the synthetic account detection system 106 can freeze the user account 402 indefinitely or temporarily or restrict certain access to certain features or services via the user account 402.

In one or more embodiments, upon disabling the user account 402, the synthetic account detection system 106 provides a notification to the user account 402 regarding the disablement of the user account 402. For example, the synthetic account detection system 106 can provide a message that is accessible to the user account 402 (e.g., provide a message at a message center of a user profile associated with the user account 402). In some cases, the synthetic account detection system 106 provides a notification using contact information associated with the user account 402. To illustrate, the synthetic account detection system 106 can provide a voice mail or text message to a phone number associated with the user account 402 or an email message to an email address associated with the user account. Indeed, in some cases, the synthetic account detection system 106 provides the notification to a computing device associated with the user account 402 via one or more channels of communication associated with the user account 402. In some implementations, however, the synthetic account detection system 106 disables the user account 402 without providing a corresponding notification.

In some implementations, the synthetic account detection system 106 reactivates the user account 402 based on a received response to the notification regarding disabling the user account 402. For instance, in one or more embodiments, the synthetic account detection system 106 disables the user account 402 and provides a notification to the user account 402 accordingly. Further, the synthetic account detection system 106 receives a response to the notification indicating that the user account 402 is non-synthetic. In some cases, the response includes identifying information (e.g., copies of identifying documents) showing the authenticity of the user account 402 (e.g., proof that the user identity associated with the user account 402 is non-synthetic). Accordingly, the synthetic account detection system 106 can determine that the user account 402 is non-synthetic and reactivate the user account 402.

In some implementations, the synthetic account detection system 106 determines how to disable the user account 402 based on different precision thresholds. To illustrate, the synthetic account detection system 106 can determine to suspend the user account 402 if the precision score 410 satisfies a first precision threshold but determines to close the user account 402 if the precision score 410 satisfies a second (e.g., higher) precision threshold. In some cases, the synthetic account detection system 106 can similarly provide a notification to the user account based on different precision thresholds.

In one or more embodiments, the synthetic account detection system 106 determines how to disable the user account 402 based on other criteria. To illustrate, as discussed above, the digital system associated with the user account 402 is a digital finance system. Accordingly, in some cases, the user account 402 includes a financial account (e.g., a savings account or an investment account). Thus, the synthetic account detection system 106 can determine how to disable the user account 402 based on a balance associated with the user account 402. For example, the synthetic account detection system 106 can determine to close the user account 402 if its associated balance is at zero. Conversely, the synthetic account detection system 106 can determine to suspend the user account 402 if the balance of the user account 402 is non-zero. Thus, the synthetic account detection system 106 can ensure that the user account 402 does not permanently lose its funds in the case where the user account 402 is non-synthetic.

In some cases, the synthetic account detection system 106 implements the synthetic account detection machine learning model 406 as part of a gradual rollout. For example, the synthetic account detection system 106 can gradually lower the precision threshold for disabling synthetic user accounts. For FIG. 4B illustrates a diagram for lowering the precision threshold for disabling synthetic user accounts in accordance with one or more embodiments.

As shown in FIG. 4B, the synthetic account detection system 106 performs an act 420 of implementing the synthetic account detection machine learning model to disable synthetic user accounts using an initial precision threshold. In particular, the synthetic account detection system 106 utilizes the synthetic account detection machine learning model to generate indications that user accounts of a digital system are synthetic or non-synthetic, such as by generating precision scores for the user accounts that indicate likelihoods that the user accounts are synthetic. The synthetic account detection system 106 can further compare the precisions scores to the initial precision threshold and determine to disable the user accounts if their corresponding precision score satisfies the precision threshold as discussed above with reference to FIG. 4A.

As further shown in FIG. 4B, the synthetic account detection system 106 performs and act 422 of testing performance of the synthetic account detection machine learning model on a sample batch of user accounts using a lower precision threshold. Indeed, in one or more embodiments, the synthetic account detection system 106 tests a lower precision threshold to determine whether the synthetic account detection machine learning model can accurately identify synthetic user accounts in accordance with the lower precision threshold.

For instance, the synthetic account detection system 106 can utilize the synthetic account detection machine learning model to generate indications that user accounts from the sample batch of user accounts are synthetic or non-synthetic, such as be generating precision scores for the user accounts. The synthetic account detection system 106 can further compare the precision scores to the lower precision threshold and disable those user accounts corresponding to a precision score that satisfies the lower precision threshold.

In one or more embodiments, the synthetic account detection system 106 sends a notification to each disabled user account regarding the disabling of the user account (e.g., sends a notification to a computing device associated with the user account). Further, the synthetic account detection system 106 monitors the responses received from the disabled user accounts. For instance, the synthetic account detection system 106 can receive a user response from a disabled user account, and the synthetic account detection system 106 can determine that the disabled user account is non-synthetic based on the response. In some cases, the synthetic account detection system 106 does not receive a response from a disabled user account and determines that the disabled user account is synthetic based on the lack of response. Accordingly, the synthetic account detection system 106 can determine the accuracy of detecting and disabling synthetic user accounts in accordance with the lower precision threshold.

Additionally, as shown in FIG. 4B, the synthetic account detection system 106 performs and act 424 of, based on the tested performance, implementing the synthetic account detection machine learning model to disable synthetic user accounts using the lower precision threshold. Indeed, the synthetic account detection system 106 can determine to disable additional (e.g., subsequently analyzed) user accounts if the synthetic account detection machine learning model generates precision scores for those user accounts that satisfy the lower precision threshold.

In one or more embodiments, the synthetic account detection system 106 determines to utilize the lower precision threshold for disabling additional user accounts based on determining that all of the disabled user accounts from the test batch of user accounts failed to respond to the notification of being disabled. In some cases, the synthetic account detection system 106 determines to utilize the lower precision threshold based on determining that a majority of the disabled user accounts failed to respond to the notification. In some cases, the synthetic account detection system 106 determines to maintain the initial precision threshold upon determining that at least one disabled user account from the test batch responded to the notification. Thus, the synthetic account detection system 106 monitors performance of using the lower precision threshold and determines to fully implement the lower precision threshold based on the performance.

By utilizing a synthetic account detection machine learning model to detect synthetic accounts, the synthetic account detection system 106 operates more flexibly than those conventional systems that rely on rigid rules for detection. In particular, the synthetic account detection system 106 can more flexibly adapt to patterns that are common among synthetic user accounts but not recognized through application of the detection rules. To illustrate, by generating a synthetic account detection machine learning model using known synthetic user accounts and other user accounts that are associated with those known synthetic user accounts (e.g., via at least one common account feature), the synthetic account detection system 106 learns to recognize patterns that extend beyond the known synthetic user accounts. Thus, the synthetic account detection system 106 can more flexibly adapt when compared to the set of rules utilized by many conventional systems.

Further, the synthetic account detection system 106 operates more accurately than many conventional systems. Indeed, by flexibly adapting to and recognizing various patterns that are common among synthetic user accounts, the synthetic account detection system 106 more accurately detects those synthetic user accounts within a digital system. Accordingly, the synthetic account detection system 106 generates more accurate indications (e.g., precision scores) of whether user accounts are synthetic or non-synthetic.

Figure 5:
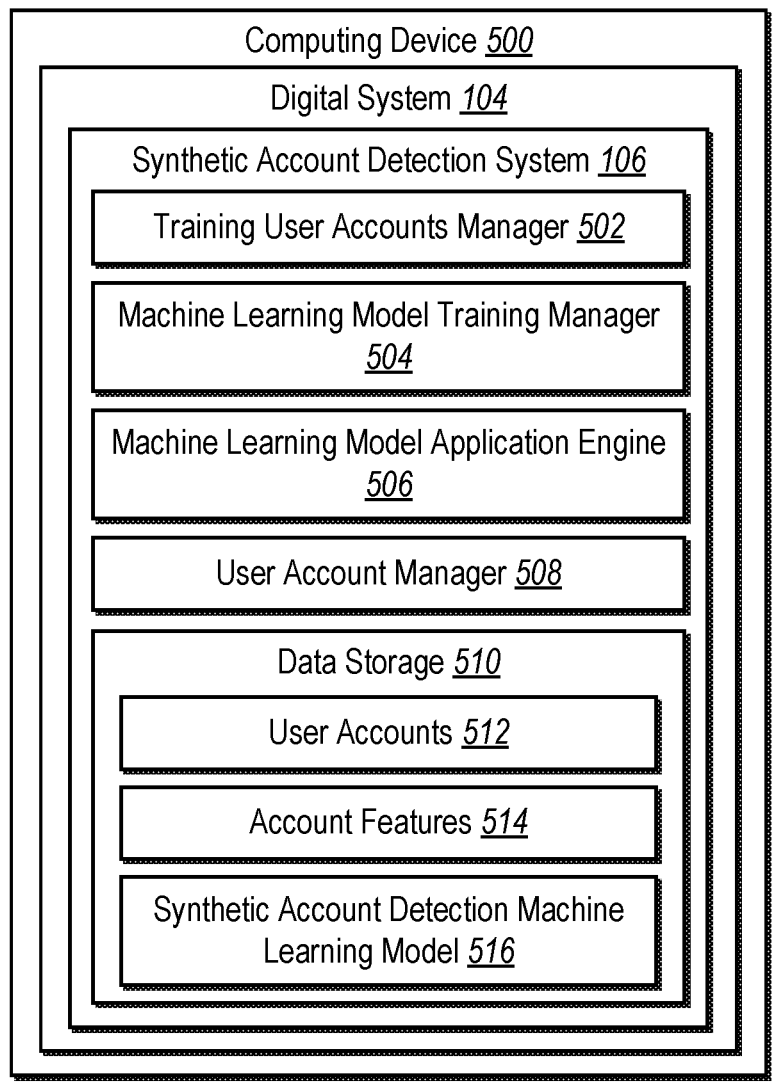
FIG. 5 illustrates an example schematic diagram of a synthetic account detection system in accordance with one or more embodiments.

Turning now to FIG. 5, additional detail will now be provided regarding various components and capabilities of the synthetic account detection system 106. In particular, FIG. 5 illustrates the synthetic account detection system 106 implemented by the computing device 500 (e.g., the server(s) 102 and/or one of the client devices 110a-110n discussed above with reference to FIG. 1). Additionally, the synthetic account detection system 106 is also part of the digital system 104. As shown, the synthetic account detection system 106 includes, but is not limited to, a training user account manager 502, a machine learning model training manager 504, a machine learning model application engine 506, a user account manager 508, and data storage 510 (which includes user accounts 512, account features 514, and a synthetic account detection machine learning model 516).

As just mentioned, and as illustrated in FIG. 5, the synthetic account detection system 106 includes the training user account manager 502. In one or more embodiments, the training user account manager 502 identifies user accounts for use in training a synthetic account detection machine learning model. For example, the training user account manager 502 can identify synthetic user accounts and non-synthetic user accounts. In some implementations, the training user account manager 502 identifies the synthetic user accounts by identifying one or more synthetic user accounts based on synthetic account detection rules. Further, the training user account manager 502 identifies those user accounts having a direct association (e.g., sharing a common account feature) with those synthetic user accounts identified using the synthetic account detection rules.

Additionally, as shown in FIG. 5, the synthetic account detection system 106 includes the machine learning model training manager 504. In one or more embodiments, the machine learning model training manager 504 trains a synthetic account detection machine learning model to detect synthetic user accounts. In particular, the machine learning model training manager 504 can train a synthetic account detection machine learning model to generate an indication that a user account is synthetic or non-synthetic, such as by generating a precision score for the user account. Indeed, in some cases, the machine learning model training manager 504 implements an iterative training process to learn model parameters for the synthetic account detection machine learning model.

Further, as shown in FIG. 5, the synthetic account detection system 106 includes the machine learning model application engine 506. In one or more embodiments, the synthetic account detection system 106 utilizes the synthetic account detection machine learning model trained by the machine learning model training manager 504 to detect synthetic user accounts. In particular, the machine learning model application engine 506 can utilize the synthetic account detection machine learning model to generate an indication that a user account is synthetic or non-synthetic based on account features related to the user account.

As shown in FIG. 5, the synthetic account detection system 106 also includes the user account manager 508. In one or more embodiments, the user account manager 508 manages a user account based on an indication generated for the user account by the machine learning model application engine 506. For example, upon determining that the machine learning model application engine 506 generated an indication that a user account is non-synthetic, the user account manager 508 can maintain the current status of the user account on the digital system 104. Upon determining that the machine learning model application engine 506 generated an indication that a user account is synthetic, the user account manager 508 can disable the user account, such as by closing or suspending the user account. In some cases, the user account manager 508 sends a notification to a disabled user account regarding the user account being disabled. In some instances, the user account manager 508 receives a response to the notification, determines that the disabled user account is synthetic based on the response, and reactivates the user account.

Additionally, as shown in FIG. 5, the synthetic account detection system 106 includes data storage 510. In particular, data storage 510 includes user accounts 512, account features 514, and the synthetic account detection machine learning model 516. In one or more embodiments, user accounts 512 stores the user account of the digital system 104. Account features 514 can store one or more account features related to each user account of the digital system 104, including those account features received from a third-party system. Further, synthetic account detection machine learning model 516 can store the synthetic account detection machine learning model trained by the machine learning model training manager 504 and implemented by the machine learning model application engine 506.

Each of the components 502-516 of the synthetic account detection system 106 can include software, hardware, or both. For example, the components 502-516 can include one or more instructions stored on a computer-readable storage medium and executable by processors of one or more computing devices, such as a client device or server device. When executed by the one or more processors, the computer-executable instructions of the synthetic account detection system 106 can cause the computing device(s) to perform the methods described herein. Alternatively, the components 502-516 can include hardware, such as a special-purpose processing device to perform a certain function or group of functions. Alternatively, the components 502-516 of the synthetic account detection system 106 can include a combination of computer-executable instructions and hardware.

Furthermore, the components 502-516 of the synthetic account detection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-516 of the synthetic account detection system 106 may be implemented as a stand-alone application, such as a desktop or mobile application. Furthermore, the components 502-516 of the synthetic account detection system 106 may be implemented as one or more web-based applications hosted on a remote server. Alternatively, or additionally, the components 502-516 of the synthetic account detection system 106 may be implemented in a suite of mobile device applications or "apps."

Figure 6:
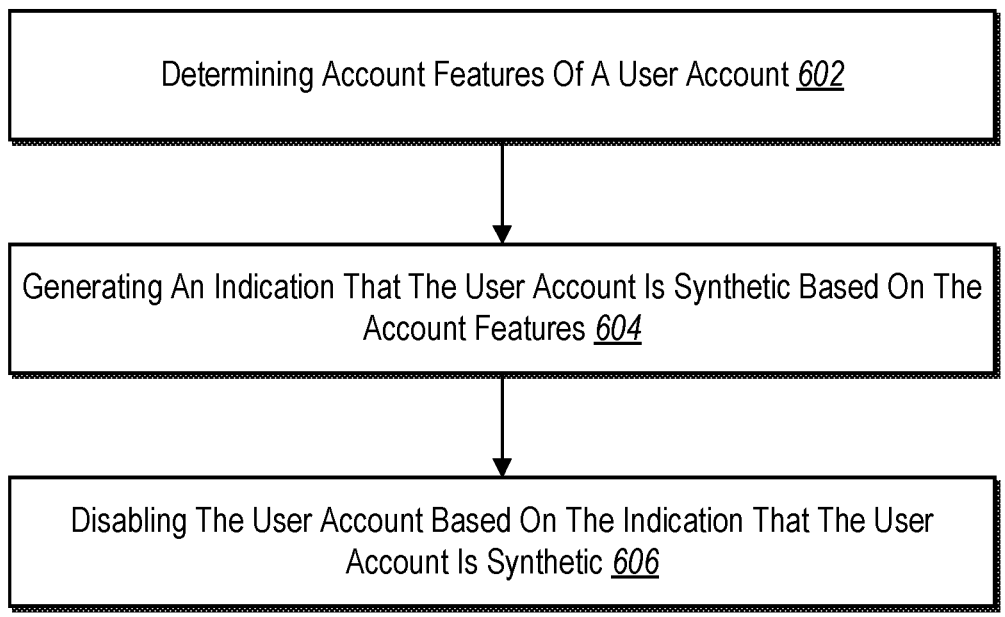
FIG. 6 illustrates a flowchart of a series of acts for determining that a user account of a digital system is a synthetic user account in accordance with one or more embodiments.
Figure 7:
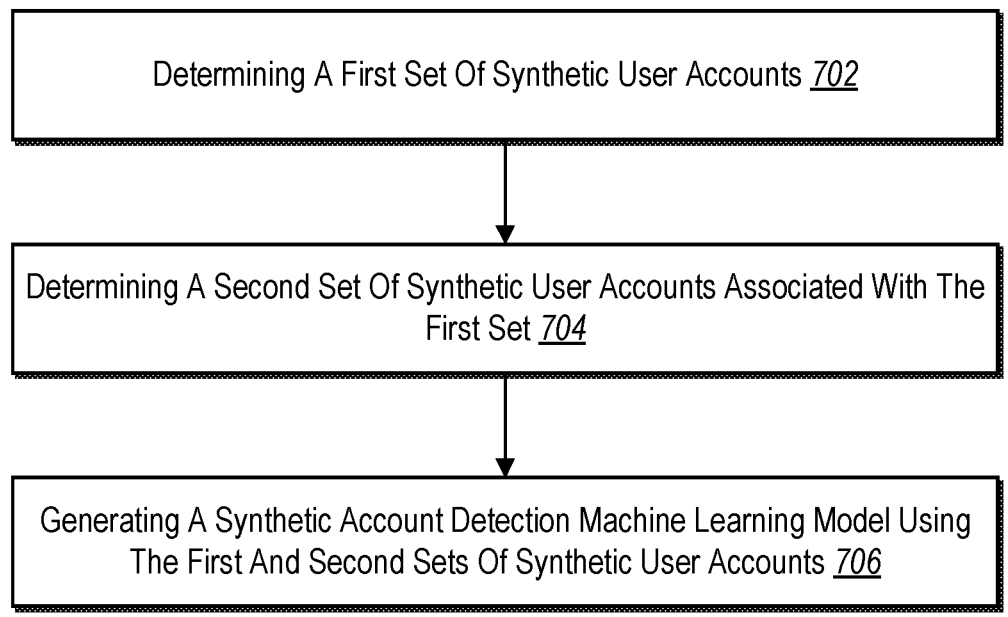
FIG. 7 illustrates a flowchart of a series of acts for generating a synthetic account detection machine learning model to detect synthetic user accounts in accordance with one or more embodiments.

FIGS. 1-5, the corresponding text and the examples provide a number of different methods, systems, devices, and non-transitory computer-readable media of the synthetic account detection system 106. In addition to the foregoing, one or more embodiments can also be described in terms of flowcharts comprising acts for accomplishing particular results, as shown in FIGS. 6-7. FIGS. 6-7 may be performed with more or fewer acts. Further, the acts may be performed in different orders. Additionally, the acts described herein may be repeated or performed in parallel with one another or in parallel with different instances of the same or similar acts.

FIG. 6 illustrates a flowchart of a series of acts for determining that a user account of a digital system is a synthetic user account in accordance with one or more embodiments. While FIG. 6 illustrates acts according to one embodiment, alternative embodiments may omit, add to, reorder, and/or modify any of the acts shown in FIG. 6. In some implementations, the acts of FIG. 6 are performed as part of a computer-implemented method. Alternatively, a non-transitory computer-readable medium can store instructions thereon that, when executed by at least one processor, cause a computing device to perform the acts of FIG. 6. In some embodiments, a system performs the acts of FIG. 6. For example, in one or more embodiments, a system includes at least one processor and a non-transitory computer-readable medium comprising instructions that, when executed by the at least one processor, cause the system to perform the acts of FIG. 6.

The series of acts 600 includes an act 602 of determining account features of a user account. For example, in one or more embodiments, the act 602 involves determining a plurality of account features related to a user account of a digital system. In some embodiments, determining the plurality of account features related to the user account of the digital system comprises determining one or more of a user profile feature, a member acquisition feature, a member service feature, a device feature, a third-party feature, a device ID feature, or a device IP feature.

The series of acts 600 also includes an act 604 of generating an indication that the user account is synthetic based on the account features. For example, in one or more embodiments, the act 604 involves generating, utilizing a synthetic account detection machine learning model, an indication that the user account is synthetic based on the plurality of account features. In some cases, utilizing the synthetic account detection machine learning model to generate the indication that the user account is synthetic comprises utilizing a random forest classifier to generate the indication that the user account is synthetic.

Further, the series of acts 600 includes an act 606 of disabling the user account based on the indication that the user account is synthetic. For instance, in one or more embodiments, the act 606 involves disabling the user account to prevent one or more actions of the user account on the digital system based on the indication that the user account is synthetic. In some embodiments, disabling the user account comprises closing the user account. In some instances, disabling the user account comprises suspending the user account and providing a notification to the user account regarding suspension of the user account.

In one or more embodiments, the synthetic account detection system 106 utilizes precision scores to determine whether a user account is synthetic or non-synthetic. For instance, in some implementations, the synthetic account detection system 106 determines a precision threshold for disabling synthetic user accounts of the digital system. Accordingly, in some cases, the synthetic account detection system 106 generates the indication that the user account is synthetic by generating a precision score indicating a likelihood that the user account is synthetic. Further, the synthetic account detection system 106 disables the user account based on the indication that the user account is synthetic by disabling the user account based on determining that the precision score satisfies the precision threshold.

In some embodiments, the series of acts 600 further include acts for lowering the precision threshold used for disabling user accounts determined to be synthetic. For instance, in some implementations, the acts include determining a subsequent precision threshold that is lower than the precision threshold; generating, for a batch of user accounts of the digital system, at least one precision score indicating that at least one user account from the batch of user accounts is synthetic utilizing the synthetic account detection machine learning model; and disabling the at least one user account from the batch of user accounts based on determining that the at least one precision score satisfies the subsequent precision threshold. Further, the acts can include providing a notification to the at least one user account regarding disabling the at least one user account; and determining to utilize the subsequent precision threshold to disable additional synthetic user accounts based on a response to the notification provided to the at least one user account. Additionally, the acts can include determining account features related to an additional user account of the digital system; generating, utilizing the synthetic account detection machine learning model, an additional precision score indicating a likelihood that the additional user account is synthetic; and disabling the additional user account based on determining that the additional precision score satisfies the subsequent precision threshold.

FIG. 7 illustrates a flowchart of a series of acts for generating a synthetic account detection machine learning model to detect synthetic user accounts in accordance with one or more embodiments. While FIG. 7 illustrates acts according to one embodiment, alternative embodiments may omit, add to, reorder, and/or modify any of the acts shown in FIG. 7. In some implementations, the acts of FIG. 7 are performed as part of a computer-implemented method. Alternatively, a non-transitory computer-readable medium can store instructions thereon that, when executed by at least one processor, cause a computing device to perform the acts of FIG. 7. In some embodiments, a system performs the acts of FIG. 7. For example, in one or more embodiments, a system includes at least one processor and a non-transitory computer-readable medium comprising instructions that, when executed by the at least one processor, cause the system to perform the acts of FIG. 7.

The series of acts 700 includes an act 702 of determining a first set of synthetic user accounts. For example, in one or more embodiments, the act 702 involves determining, utilizing one or more synthetic account detection rules, a first set of synthetic user accounts that includes user accounts of a digital system The series of acts 700 also includes an act 704 of determining a second set of synthetic user accounts associated with the first set. For instance, in one or more embodiments, the act 704 involves determining a second set of synthetic user accounts that includes additional user accounts of the digital system based on associations between the additional user accounts and the user accounts from the first set of synthetic user accounts.

In one or more embodiments, the synthetic account detection system 106 determines the associations between the additional user accounts and the user accounts from the first set of synthetic user accounts by determining, for an additional user account, at least one account feature that is shared between the additional user account and a user account from the first set of synthetic user accounts. In some cases, determining the at least one account feature that is shared between the additional user account and the user account from the first set of synthetic user accounts comprises determining that the additional user account and the user account from the first set of synthetic user accounts include a common device ID.

Further, the series of acts 700 includes an act 706 of generating a synthetic account detection machine learning model using the first and second sets of synthetic user accounts. For example, in one or more embodiments, the act 706 involves generating a synthetic account detection machine learning model to identify synthetic user accounts of the digital system by learning model parameters using the first set of synthetic user accounts and the second set of synthetic user accounts.

In one or more embodiments, learning the model parameters using the first set of synthetic user accounts and the second set of synthetic user accounts comprises iteratively: generating, utilizing the synthetic account detection machine learning model, a predicted indication that a user account from the first set of synthetic user accounts or the second set of synthetic user accounts is synthetic based on account features associated with the user account; determining an error associated with the predicted indication; and modifying the model parameters of the synthetic account detection machine learning model based on the error.

In some cases, the series of acts 700 further includes acts for implementing the synthetic account detection machine learning model. For instance, in some implementations, the acts include generating, utilizing the synthetic account detection machine learning model, an indication that a user account of the digital system is synthetic based on a plurality of account features related to the user account; and disabling the user account to prevent one or more actions of the user account on the digital system based on the indication that the user account is synthetic.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
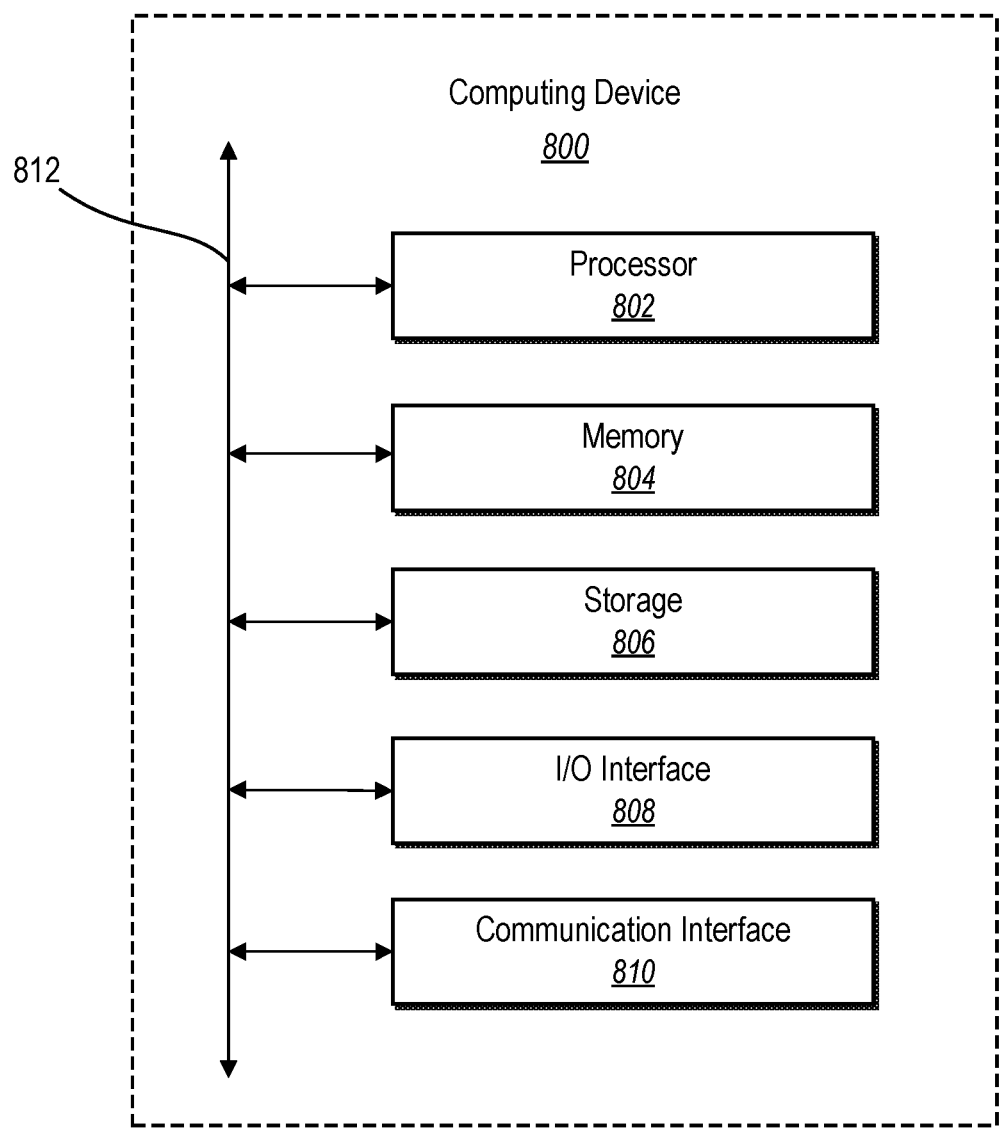
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 102, the client devices 110a-110n, and/or the third-party server 114). In one or more embodiments, the computing device 800 may be a mobile device (e.g., a mobile telephone, a smartphone, a PDA, a tablet, a laptop, a camera, a tracker, a watch, a wearable device). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 including storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known 110 devices or a combination of such 110 interfaces 808. The touch screen may be activated with a stylus or a finger.

The 110 interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, 110 interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining a plurality of account features related to a user account of a digital system;
   generating, utilizing a synthetic account detection machine learning model trained using known synthetic user accounts and additional user accounts that are suspected to be synthetic user accounts based on one or more associations with the known synthetic user accounts, an indication that the user account is synthetic based on the plurality of account features; and
   disabling the user account to prevent one or more actions of the user account on the digital system based on the indication that the user account is synthetic.

2. The computer-implemented method of claim 1, further comprising determining a precision threshold for disabling synthetic user accounts of the digital system, wherein:
   generating the indication that the user account is synthetic comprises generating a precision score indicating a likelihood that the user account is synthetic; and
   disabling the user account based on the indication that the user account is synthetic comprises disabling the user account based on determining that the precision score satisfies the precision threshold.

3. The computer-implemented method of claim 2, further comprising:
   determining a subsequent precision threshold that is lower than the precision threshold;
   generating, for a batch of user accounts of the digital system, at least one precision score indicating that at least one user account from the batch of user accounts is synthetic utilizing the synthetic account detection machine learning model; and
   disabling the at least one user account from the batch of user accounts based on determining that the at least one precision score satisfies the subsequent precision threshold.

4. The computer-implemented method of claim 3, further comprising:
   providing a notification to the at least one user account regarding disabling the at least one user account; and
   determining to utilize the subsequent precision threshold to disable additional synthetic user accounts based on a response to the notification provided to the at least one user account.

5. The computer-implemented method of claim 4, further comprising:
   determining account features related to an additional user account of the digital system;
   generating, utilizing the synthetic account detection machine learning model, an additional precision score indicating a likelihood that the additional user account is synthetic; and
   disabling the additional user account based on determining that the additional precision score satisfies the subsequent precision threshold.

6. The computer-implemented method of claim 1, wherein disabling the user account comprises closing the user account.

7. The computer-implemented method of claim 1, wherein disabling the user account comprises suspending the user account and providing a notification to the user account regarding suspension of the user account.

8. The computer-implemented method of claim 1, wherein determining the plurality of account features related to the user account of the digital system comprises determining one or more of a user profile feature, a member acquisition feature, a member service feature, a device feature, a third-party feature, a device ID feature, or a device IP feature.

9. The computer-implemented method of claim 1, wherein the one or more associations between the known synthetic user accounts and the additional user accounts comprises at least one of a common device ID, a common physical address, a common email address, or a common phone number.

10. A non-transitory computer-readable medium storing instructions thereon that, when executed by at least one processor, cause a computing device to:
    determine a plurality of account features related to a user account of a digital system;
    generate, utilizing a synthetic account detection machine learning model trained using known synthetic user accounts and additional user accounts that are suspected to be synthetic user accounts based on one or more associations with the known synthetic user accounts, an indication that the user account is synthetic based on the plurality of account features; and
    disable the user account to prevent one or more actions of the user account on the digital system based on the indication that the user account is synthetic.

11. The non-transitory computer-readable medium of claim 10,
    further comprising instructions that, when executed by the at least one processor, cause the computing device to determine a precision threshold for disabling synthetic user accounts of the digital system,
    wherein the instructions, when executed by the at least one processor, cause the computing device to:
       generate the indication that the user account is synthetic by generating a precision score indicating a likelihood that the user account is synthetic; and
       disable the user account based on the indication that the user account is synthetic by disabling the user account based on determining that the precision score satisfies the precision threshold.

12. The non-transitory computer-readable medium of claim 11, further comprising instructions that, when executed by the at least one processor, cause the computing device to:
    determine a subsequent precision threshold that is lower than the precision threshold;
    generate, for a batch of user accounts of the digital system, at least one precision score indicating that at least one user account from the batch of user accounts is synthetic utilizing the synthetic account detection machine learning model; and disable the at least one user account from the batch of user accounts based on determining that the at least one precision score satisfies the subsequent precision threshold.

13. The non-transitory computer-readable medium of claim 12, further comprising instructions that, when executed by the at least one processor, cause the computing device to:

provide a notification to the at least one user account regarding disabling the at least one user account; and determine to utilize the subsequent precision threshold to disable additional synthetic user accounts based on a response to the notification provided to the at least one user account.

14. The non-transitory computer-readable medium of claim 10, wherein the instructions, when executed by the at least one processor, cause the computing device to disable the user account by closing the user account.

15. The non-transitory computer-readable medium of claim 10, wherein the instructions, when executed by the at least one processor, cause the computing device to disable the user account by suspending the user account and providing a notification to the user account regarding suspension of the user account.

16. A system comprising:

at least one processor; and a non-transitory computer-readable medium comprising instructions that, when executed by the at least one processor, cause the system to:

determine a plurality of account features related to a user account of a digital system;

generate, utilizing a synthetic account detection machine learning model trained known synthetic user accounts and additional user accounts that are suspected to be synthetic user accounts based on one or more associations with the known synthetic user accounts, an indication that the user account is synthetic based on the plurality of account features; and disable the user account to prevent one or more actions of the user account on the digital system based on the indication that the user account is synthetic.

17. The system of claim 16, further comprising instructions that, when executed by the at least one processor, cause the system to determine a precision threshold for disabling synthetic user accounts of the digital system, wherein the instructions, when executed by the at least one processor, cause the system to:

generate the indication that the user account is synthetic by generating a precision score indicating a likelihood that the user account is synthetic; and disable the user account based on the indication that the user account is synthetic by disabling the user account based on determining that the precision score satisfies the precision threshold.

18. The system of claim 17, further comprising instructions that, when executed by the at least one processor, cause the system to:

determine a subsequent precision threshold that is lower than the precision threshold;

generate, for a batch of user accounts of the digital system, at least one precision score indicating that at least one user account from the batch of user accounts is synthetic utilizing the synthetic account detection machine learning model; and disable the at least one user account from the batch of user accounts based on determining that the at least one precision score satisfies the subsequent precision threshold.

19. The system of claim 18, further comprising instructions that, when executed by the at least one processor, cause the system to:

provide a notification to the at least one user account regarding disabling the at least one user account; and determine to utilize the subsequent precision threshold to disable additional synthetic user accounts based on a response to the notification provided to the at least one user account.

20. The system of claim 16, wherein the instructions, when executed by the at least one processor, cause the system to disable the user account by closing the user account.

* * * * *